Patented May 22, 1934

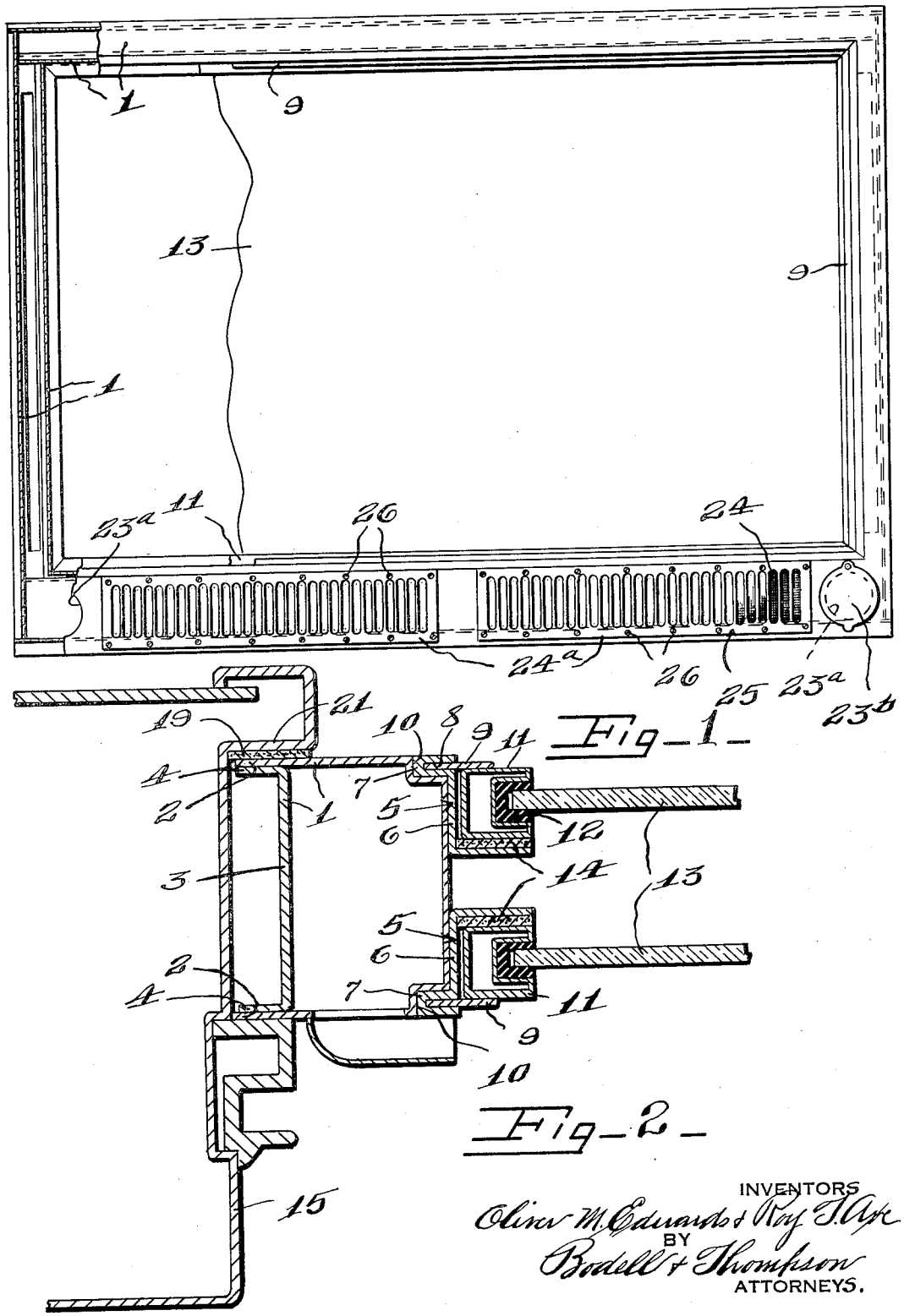

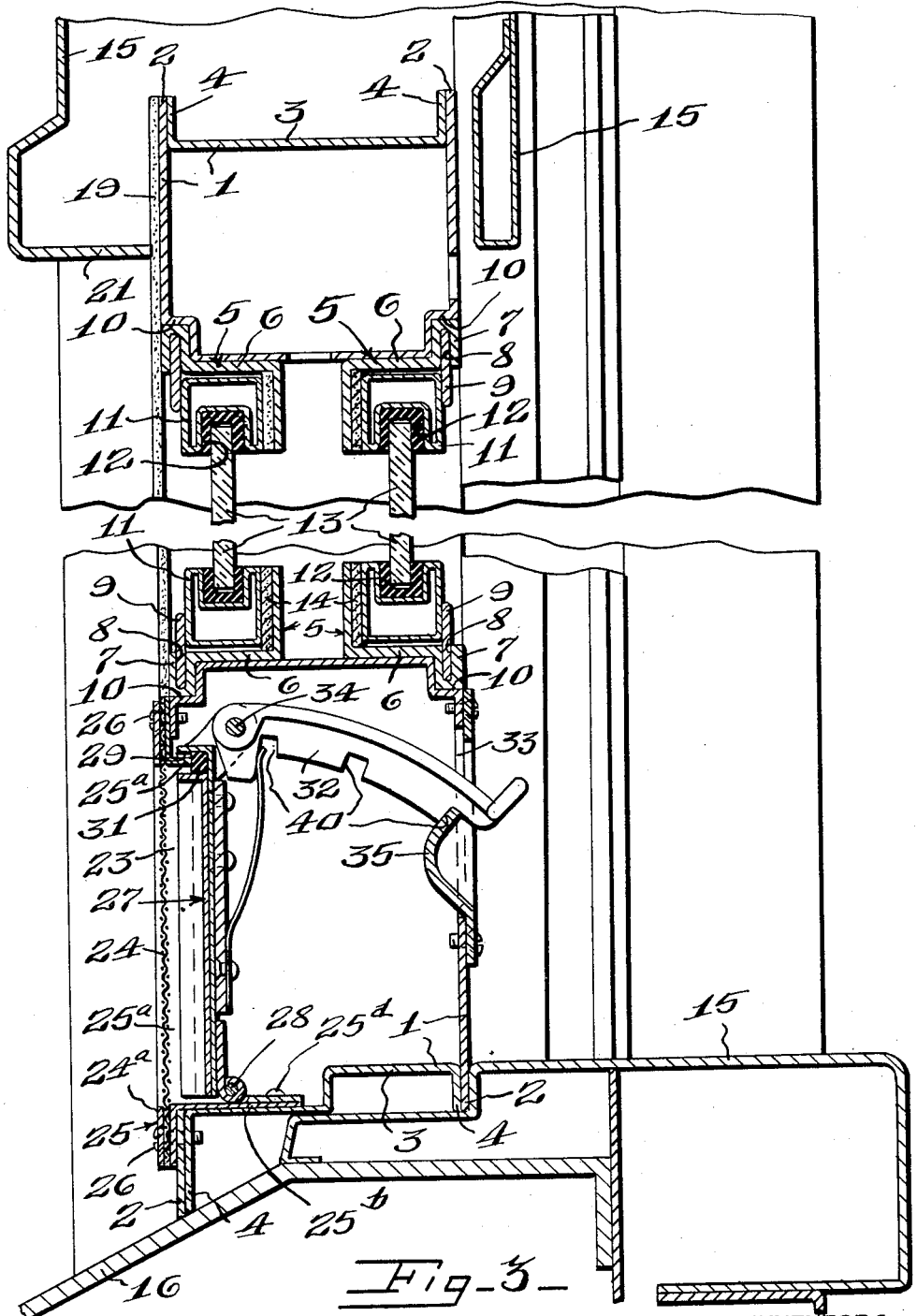

1,959,908

UNITED STATES PATENT OFFICE 1,959,908

SELF CONTAINED WINDOW ASSEMBLY FRAME

Oliver M. Edwards and Roy T. Axe, Syracuse, N. Y., assignors, by mesne assignments, to The Syracuse Trust Company, Syracuse, N. Y., a corporation of New York, trustee Original application August 28, 1929, Serial No. 389,057. Divided and this application August 26, 1931, Serial No. 559,504. Renewed October 5, 1933

1 Claim. (Cl. 189—75)

This invention relates to window constructions, and has for its object, a self contained window construction including the window frame, and a sash, or other means for supporting the window pane, which unitary structure with all pertinent parts can be assembled and accurately fitted at the factory and the unitary structure applied or fitted to the opening of the structure, as a railway car, or any other structure, without disturbing the window construction and pertinent parts, regardless of inaccuracies in the opening in which the window construction is to be applied, all whereby, the essential parts of the window construction which work together and must be accurately fitted together, are not disturbed by the unskilled workmen employed in applying the window construction in the window opening.

Heretofore, the component parts such as the sash, window fixtures and sash guides have been assembled by the car builder in the window opening and difficulties often occurred, due to variations in said window opening, causing faulty applications by the workman.

The invention consists in the novel features and in the combinations and constructions hereinafter set forth and claimed.

In describing this invention, reference is had to the accompanying drawings, in which like characters designate corresponding parts in all the views.

Figure 1 is a front elevation, partly broken away, of a window construction embodying our invention.

Figure 2 is a transverse sectional view through one of the side members of the window frame, the contiguous part of the opening in the structure to which the window is applied, being also shown.

Figure 3 is an enlarged, fragmentary, vertical, sectional view through the window construction shown in Figure 1, the contiguous part of the opening in the structure to which the window is applied being also shown.

This window assembly includes a window frame provided with means for carrying the glass pane and having outwardly extending flanges along two or more of the marginal edges of the window frame assembly, these flanges being designed to contact with the sides of the opening in the structure to which the window assembly is applied. The metal flanges are constructed so that they may be trimmed off, without effecting the construction or fastening of the window assembly, such trimming being necessary if the opening in the structure is not properly squared, or the dimensions are otherwise defective.

The window assembly also includes a frame member which is provided with a ventilator for receiving air from the outside of the structure, or car, and an outlet opening on the inner side of the frame for admitting air into the structure, or car. The novel features of this ventilator construction and control is the subject matter of application 389,057, filed August 28, 1929, of which this application is a division.

The window construction is particularly designed for railway cars and motor busses, although it is applicable to other structures. It is particularly designed for large stationary windows which have no opening and closing movement, such as dining car windows.

Referring to the drawings; a frame 1 is preferably formed hollow and of sheet metal in any suitable manner, this frame being provided with outwardly extending marginal flanges 2 which can be trimmed off, if necessary, to accurately fit the walls of the opening in the structure in which the window is applied.

The members of the frame formed of sheet metal are here shown as so formed that the marginal flanges 2 and the frame construction between the flanges form a channel shaped section with the open side of the channel facing outwardly from the frame. A channel shaped tie member or plate 3 is mounted between the flanges as shown in Figure 4, with the sides of the channel or flanges 4 secured to the flanges 2 by suitable means, such as spot welding, at points spaced away from the edges of the flanges so that the parts will remain secured together even though considerable material is trimmed off the edges of the flanges.

The frame is provided with any suitable means for carrying the glass pane and is here shown as provided with a sash holding strip 5. The sash holding strip 5 is shown as a separate piece from the frame itself, but is a unit with the frame and may be integral with the frame. Preferably, however, this sash holding strip 5 is separable from the frame and united therewith as a unit.

The sash holding strip 5 is formed up of sheet metal into angular form, one side 6 of the formation abutting against a wall of the frame 1, and the other side projecting into the opening enclosed by the frame and forming a window stop. The side 6 is provided with an outwardly bent flange 7 bent upon itself to form a groove 8 which receives a retaining strip 9 for holding a sash in position. The angular flange 7 is seated in an inset or rabbet 10 formed at the inner corner of the frame structure 1.

A sash 11 is located in the sash strip and is formed with a re-entrant channel 12 in which a glass pane 13 is mounted. A suitable filler or weather strip 14 is inserted between the sash and the flange which forms the inner window stop. The retaining strip 9 bears against the other side of the sash 11.

The sash 11 and its holding strip 5 is the means provided on the window frame for holding the glass pane, although it will be understood that the pane 13 may be mounted directly in a channel provided in the frame 1 itself.

In the window here shown, there are two panes 13 spaced apart in the frame 1.

The window opening is provided in a structure 15. This structure is here shown as provided with sheet metal walls and with a sill portion 16 against which some of the flanges abut. In fitting the window frame to the structure, the flanges may be ground or otherwise trimmed off at their edges to fit against any surfaces of the structure to which the self contained window assembly is applied.

Referring to Figure 2 it will be obvious that if neither of the flanges 2 or 4 contact with the structure 15, the window assembly may shift until the flanges contact with the structure 15. If the flanges are constructed so that the dimensions of the window assembly are slightly greater than those of the opening to which the window is applied, the flanges may be ground down so that the window assembly exactly fits the opening and the edges of the flanges contact with the opening at both sides of the window. When the window assembly is made with the exact proper dimensions for fitting the openings in the structure, such as the openings in a dining car, and the dimensions of some openings are imperfect, it is possible to trim the edges of the flanges so that the window assembly fits the imperfect opening.

If the window assembly is made with the dimensions slightly less than those of the opening in the structure to which it is applied, this invention provides a construction in which a wedge, or other means, may be inserted between the structure and the channel plate 3. If the channel plate 3 were mounted in the conventional manner, with the open side of the channel facing inwardly, the clearance between the channel plate 3 and the side of the structure would be so small that the difficulty of inserting means for holding the window assembly against shifting would be enormously increased.

A filler or weather strip 19 is usually interposed between the outer face of the frame, or the flanges thereof, and the abutting wall 21 of the opening in the structure to which the frame is applied.

One of the frame members, preferably, the lower frame member is formed with ventilating means and as here illustrated, the outer wall of the lower member is formed with an opening 23 which is covered by a screen 24, the screen being mounted in a marginal frame 25. The marginal frame 25 comprises an inner angular section fitted in the opening 23 and an outer section for retaining the screen 24. One flange of the inner angular section laps the outer face of the front wall of the lower frame member around the opening 23 and the other flange extends through the opening 23. The flanges 25$^a$ on the top and two ends of the frame 25 extend but a short distance through the opening 23. The portion 25$^b$ of the flange at the bottom of the frame 25 extends farther through the opening 23 and laps or rests on the inner face of the edge wall 3 which closes the lower member of the frame 1. One of the hinge leaves of the piano hinge of the closure for the opening 23 laps this flange 25$^b$ and this portion 25$^b$ and the hinge leaf is secured to the edge wall 3 of the lower member of the frame 1 in any suitable manner as by rivets 25$^d$. The margins of the screen 24 and also of a slotted plate 24$^a$ extend between the two sections of the frame 25. The sections of the frame 25 are secured together in the opening 23 as by screws 26.

The front wall of the lower frame member is provided with one or more clean out openings normally closed by covers. As here shown, the clean out openings 23$^a$ are provided at the ends of the lower frame member so that a brush or other tool can be inserted into the lower frame member through the holes 23$^a$ to clean out dirt that may accumulate between the screen 24 and the closure 27, especially about the hinge of the closure. 23$^b$ are pivoted closures for the clean out openings.

The opening 23 is closed against the inlet of air by a shutter 27 here shown as pivoted at 28, preferably by a piano hinge, to the lower wall of the bottom member of the frame as before described, this closure having a forwardly facing channel 29 at its top and side edges for receiving a corresponding inwardly extending flange 25$^a$ provided on the screen frame 25. A suitable buffer or weather strip 31 is located in the channel 29 in which the edge of the flange 25$^a$ compresses when the shutter is closed.

The shutter is operated by suitable means here illustrated, as an arm 32 extending transversely into the lower frame member through a passage 33 at the inner side thereof and being pivotally connected at 34 to the upper edge of the shutter in order to have a slight pivotal movement to disengage it from a latch plate 35 projecting into the opening 33. The latch has a plurality of notches for coacting with the latch plate 35 when the shutter is closed, or fully open, and partly open. The arm 32 has a hand engaging portion at its outer end.

This entire window assembly can be built at the factory and all parts thereof accurately fitted, and when the sash or pane carrying means is formed separable from the frame, it also can be accurately fitted to the frame and any fixtures on the window assembly can be accurately applied so that when the construction is delivered to the car builder, or other user, it can be fitted to the opening of the structure without in any way disturbing the window assembly except by trimming off the edges, should trimming be required, of the flanges to fit slightly varying sizes of window openings and inaccuracies or obstructions in the window openings. This fitting requires a less skilled class of workmen than does the construction of the window assembly, and hence the invention avoids the necessity of this less skilled class doing any skilled work on the window assembly and provides a window assembly which is self contained and works as intended even though not skillfully applied to the window opening. The work done at the factory does not have to be done over again, or modified by the unskilled workmen fitting the unitary window assembly to the window opening.

The invention is shown in its preferred embodiment but various changes and modifications may be made without departing from the spirit of the invention as set forth in the appended claim.

What we claim is:

In a metal window construction, the combination with a structure having a window opening therein; of a hollow sheet metal frame encircling a sash; outwardly extending flanges on the frame for contacting with the walls of the window opening in the structure; the edges of the flanges being designed to be trimmed off to fit said window opening so that the frame may be fitted to the opening and compensate for misalinements of the walls of the window opening; and inner and outer stops for preventing movement of the frame in a direction transverse to the plane of the window.

OLIVER M. EDWARDS.
ROY T. AXE.